US012657683B2

(12) United States Patent     (10) Patent No.: US 12,657,683 B2

Ganse et al.     (45) Date of Patent: Jun. 16, 2026

(54) SYSTEMS AND METHODS FOR HIGH THROUGHPUT ANOMALY DETECTION WITH 3-D MILLIMETER WAVE IMAGING

(71) Applicant: THRUWAVE INC., Seattle, WA (US)

(72) Inventors: Andrew A. Ganse, Seattle, WA (US); Christine Madden, Seattle, WA (US); Claire M. Watts, Seattle, WA (US); Andreas Pedross-Engel, Seattle, WA (US); Matthew S. Reynolds, Seattle, WA (US)

(73) Assignee: THRUWAVE INC., Seattle, WA (US)

( * ) Notice: Subject to any disclaimer, the term of this patent is extended or adjusted under 35 U.S.C. 154(b) by 226 days.

(21) Appl. No.: 18/554,614

(22) PCT Filed: Mar. 31, 2022

(86) PCT No.: PCT/US2022/022754

§ 371 (c)(1),
(2) Date: Oct. 9, 2023

(87) PCT Pub. No.: WO2022/216512

PCT Pub. Date: Oct. 13, 2022

(65) Prior Publication Data

US 2024/0192148 A1     Jun. 13, 2024

Related U.S. Application Data

(60) Provisional application No. 63/173,322, filed on Apr. 9, 2021.

(51) Int. Cl.
G06T 7/00 (2017.01)
G01N 23/046 (2018.01)
(Continued)

(52) U.S. Cl.
CPC ......... G06T 7/0004 (2013.01); G01N 23/046 (2013.01); G01S 13/887 (2013.01); (Continued)

(58) Field of Classification Search
CPC ...... G01N 22/00; G01N 23/04; G01N 23/046; G01N 35/04; G01N 2001/024; (Continued)

(56) References Cited

U.S. PATENT DOCUMENTS

| | | | | |
|---|---|---|---|---|
| 5,227,800 A | * | 7/1993 | Huguenin | ............ H01Q 13/085 |
| | | | | 250/332 |
| 5,455,590 A | * | 10/1995 | Collins | ................... G01S 13/89 |
| | | | | 342/179 |

(Continued)

FOREIGN PATENT DOCUMENTS

| | | |
|---|---|---|
| CN | 111144238 A | 5/2020 |
| CN | 112305542 B | 10/2023 |

(Continued)

OTHER PUBLICATIONS

European Search Report for European Patent Application No. 22792183.0 dated Oct. 17, 2024, 9 pages.

(Continued)

*Primary Examiner* — Steven L Yeninas
(74) *Attorney, Agent, or Firm* — Perkins Coie LLP

(57) ABSTRACT

Systems and methods for detecting anomalies in an envelope including scanning an envelope moving along a conveyor with multiple millimeter wave imaging sensor modules and collecting reflection measurements from the sensor modules. The systems and methods can further include constructing a one or more voxel thick horizontal 3D image of the envelope and then creating an image of the envelope comprising the magnitude of the mean of the one or more voxel layers. The image of the envelope can be fed into a binary logistic (Continued)

regression classifier to provide a probability that the envelope contains an anomaly from the classifier. The systems and methods can include causing the envelope to be diverted from the conveyor for further inspection when the probability is greater than a selected threshold.

11 Claims, 8 Drawing Sheets

(51) Int. Cl.
  *G01S 13/88* (2006.01)
  *G06N 20/00* (2019.01)
(52) U.S. Cl.
  CPC .... *G06N 20/00* (2019.01); *G06T 2207/20076* (2013.01); *G06T 2207/30108* (2013.01); *G06V 2201/06* (2022.01)
(58) Field of Classification Search
  CPC . G06T 2207/10016; G06T 2207/10028; G06T 2207/10088; G06T 2207/10116; G06T 2207/20084; G06T 2207/30108; G06T 7/0004; G06T 7/0006; G06T 7/0008; G06T 7/001; G06T 7/62; G06T 2207/20081; G06T 2207/30112; G06T 11/00; G01S 13/887; G06V 20/52; G06V 20/64; G06V 10/82; G06V 2201/05
  See application file for complete search history.

(56) References Cited

U.S. PATENT DOCUMENTS

| | | | | |
|---|---|---|---|---|
| 5,642,393 | A | * | 6/1997 | Krug ......................... G01V 5/22 |
| | | | | 378/53 |
| 7,183,963 | B2 | | 2/2007 | Lee et al. |
| 8,350,747 | B2 | * | 1/2013 | DeLia ................... G01S 13/887 |
| | | | | 342/179 |
| 9,123,093 | B1 | * | 9/2015 | Schumacher ............. G06F 8/34 |
| 10,782,404 | B2 | * | 9/2020 | Safavi-Naeini ......... G01S 13/38 |
| 11,379,693 | B1 | * | 7/2022 | Fry ........................... G06T 7/50 |
| 12,181,422 | B2 | * | 12/2024 | Manalad ................ G06N 3/084 |
| 2002/0032515 | A1 | | 3/2002 | Bai et al. |
| 2005/0104603 | A1 | * | 5/2005 | Peschmann ............ G01V 5/222 |
| | | | | 324/637 |
| 2006/0066728 | A1 | | 3/2006 | Batur |
| 2006/0214835 | A1 | | 9/2006 | Lee et al. |
| 2007/0009085 | A1 | | 1/2007 | Otani et al. |
| 2007/0230657 | A1 | * | 10/2007 | Garms ................... G01V 5/226 |
| | | | | 378/57 |
| 2008/0152082 | A1 | * | 6/2008 | Bouchard .............. G01N 23/04 |
| | | | | 378/57 |
| 2009/0002220 | A1 | | 1/2009 | Lovberg et al. |
| 2009/0175411 | A1 | * | 7/2009 | Gudmundson ...... G06V 10/255 |
| | | | | 378/57 |
| 2009/0284405 | A1 | * | 11/2009 | Salmon ................... G01V 8/005 |
| | | | | 342/22 |
| 2010/0005044 | A1 | * | 1/2010 | Bowring ............... G01S 13/887 |
| | | | | 708/405 |
| 2011/0181300 | A1 | * | 7/2011 | Bowring ................. G01S 13/04 |
| | | | | 702/155 |
| 2015/0186839 | A1 | | 7/2015 | Chen et al. |
| 2015/0323664 | A1 | | 11/2015 | Wu et al. |
| 2016/0252646 | A1 | * | 9/2016 | Sarraiocco .............. G06F 18/22 |
| | | | | 382/103 |
| 2016/0264255 | A1 | | 9/2016 | Connor et al. |
| 2016/0275441 | A1 | | 9/2016 | Barber et al. |
| 2016/0356886 | A1 | | 12/2016 | Valdes et al. |
| 2018/0173161 | A1 | | 6/2018 | Chen et al. |
| 2019/0019318 | A1 | * | 1/2019 | Cinnamon ............. G06V 10/22 |
| 2019/0139441 | A1 | | 5/2019 | Akella et al. |
| 2019/0146500 | A1 | | 5/2019 | Yalla et al. |
| 2019/0182499 | A1 | | 6/2019 | Richert |
| 2019/0277999 | A1 | | 9/2019 | Chen et al. |
| 2019/0383927 | A1 | | 12/2019 | Mihajlovic et al. |
| 2020/0171548 | A1 | | 6/2020 | Li et al. |
| 2020/0191913 | A1 | | 6/2020 | Zhang et al. |
| 2020/0320731 | A1 | | 10/2020 | Sheen et al. |
| 2020/0344470 | A1 | | 10/2020 | Shen et al. |
| 2021/0109206 | A1 | | 4/2021 | Li et al. |
| 2021/0133666 | A1 | * | 5/2021 | Eckman .................... G06T 7/62 |
| 2021/0364629 | A1 | * | 11/2021 | Ryder .................. G06V 10/255 |
| 2022/0057519 | A1 | * | 2/2022 | Goldstein ............... G01S 17/88 |
| 2022/0230366 | A1 | * | 7/2022 | Hallgren ................. G06T 11/00 |
| 2022/0404294 | A1 | * | 12/2022 | Takayama .............. G01N 23/04 |
| 2023/0079634 | A1 | * | 3/2023 | Reynolds ............ G01S 13/9004 |
| | | | | 345/418 |

FOREIGN PATENT DOCUMENTS

| | | |
|---|---|---|
| CN | 107015222 B | 6/2024 |
| DE | 102013011239 A1 | 1/2015 |
| JP | 10153655 A | 6/1998 |
| JP | 2006267102 A | 10/2006 |
| JP | 2007218661 A | 8/2007 |
| JP | 2008007324 A | 1/2008 |
| WO | 2017159521 A1 | 9/2017 |
| WO | 2018147929 A2 | 8/2018 |
| WO | 2020027591 A1 | 2/2020 |

OTHER PUBLICATIONS

Japanese Notice of Allowance issued for Japanese Patent Application No. 2023-562264 and mailed Oct. 1, 2024.

Japanese Notice of Allowance issued for Japanese Patent Application No. 2023-562267 on Jun. 4, 2024.

Japanese Notice of Allowance issued for Japanese Patent Application No. 2023-564385 on Aug. 3, 2024.

Japanese Notice of Rejection issued for Japanese Patent Application No. 2023-562264 mailed Apr. 16, 2024.

Japanese Notice of Rejection issued for Japanese Patent Application No. 2023-564385 and mailed Mar. 19, 2024.

Supplemental European Search Report issued by European Patent Office for European Patent Application No. 22785179.7 on Jan. 8, 2025, 22 pages.

Supplemental European Search Report issued by European Patent Office for European Patent Application No. 22785179.7 on Oct. 17, 2024, 17 pages.

European communication issued for European Patent Application No. 22785180.5 dated May 6, 2025, 4 pages.

European Search Report issued for European Patent Application No. 22785180.5 dated Sep. 6, 2024, 10 pages.

International Search Report and Written Opinion issued for PCT/US2022/022754, mailed on Jul. 29, 2022, 13 pages, by U.S. International Search Authority.

Shchepetilnikov et al., "New Ultra-Fast Sub-Terahertz Linear Scanner for Postal Security Screening", International Journal of Infrared and Millimeter Waves, May 7, 2020, retrieved from internet <http://terasense.com/wp-content/uploads/2020/10/New-Ultra-Fast-Sub-Terahertz-Linear-Scanner.pdf> entire document.

Notice of Rejection dated Feb. 27, 2024 for Japanese Patent Application No. 2023-562267 by Japanese Patent Office, 3 pages.

International Search Report and Written Opinion issued for PCT/US2022/022749, mailed on Jun. 14, 2022, xx pages, by U.S. International Search Authority.

Liu et al. "Blind image restoration with sparse priori regularization for passive millimeter-wave images." Journal of Visual Communication and Image Representation 40 (2016): 58-66. Jun. 15, 2016 (Jun. 15, 2016) Retrieved on May 23, 2022 (May 23, 2022) from <https://www.sciencedirect.com/science/article/abs/pii/S1047323016300980> entire document.

International Search Report and Written Opinion issued for PCT/US2022/022757, mailed on Jun. 24, 2022, xx pages, by U.S. International Search Authority.

Pedross-Engel et al., "A Two-Sided Reflection-Based K-Band 3-D Millimeter-Wave Imaging Sisystem With Image Beat Patter Mitigation," IEEE Transactions on Microwave Theory and Techniques,

(56) References Cited

OTHER PUBLICATIONS vol. 69, No. 11, Nov. 2021 downloaded from the Internet <https://ieeexplore.leee.org/document/9442356> downloaded on May 28, 2022 (May 28, 2022), date of publication May 29, 2021 (May 26, 2021) entire document, especially FIG.1-10; pp. 5046-5049.
International Search Report and Written Opinion issued for PCT/US2022/022749, mailed on Jun. 14, 2022, 8 pages, by U.S. International Search Authority.
International Search Report and Written Opinion issued for PCT/US2022/022757, mailed on Jun. 24, 2022, 8 pages, by U.S. International Search Authority.

* cited by examiner

502 Scan envelope with K-band imaging sensors

500

504 Collect reflection measurements from the sensors

506 Construct a one or more voxel thick 3D image

508 Create image comprising mean of the one or more voxel layers

510 Feed image of the voxel layers mean into Classifier

512 Receive anomaly probability from Classifier

514 Divert envelope when probability greater than threshold

1000

SYSTEMS AND METHODS FOR HIGH THROUGHPUT ANOMALY DETECTION WITH 3-D MILLIMETER WAVE IMAGING

CROSS-REFERENCE TO RELATED APPLICATION

This application claims the benefit of and priority to U.S. Provisional Patent Application No. 63/173,322, filed Apr. 9, 2021, the disclosure of which is incorporated herein by reference in its entirety.

TECHNICAL FIELD

This patent application is directed to imaging systems, and more specifically, to high-throughput imaging systems used to scan envelopes and thin packages for contraband.

BACKGROUND

Screening and verification of mail and package contents by non-destructive methods has long been of interest in commercial and government applications in order to detect contraband items such as passports, credit cards, blades, and drugs. The past few decades have seen increasing exploration of higher-frequency electromagnetic imaging technologies for these purposes, and examples of relevant computer vision detection have been seen in fields including airport security and industrial inspection. Even with the existing applications of higher-frequency electromagnetic imaging technologies there is still a need for higher throughput screening with improved accuracy.

SUMMARY

In some embodiments, a system for detecting anomalies in a parcel can include a conveyor operative to carry a parcel, an array of millimeter wave transmitting and receiving antennas disposed proximate to the conveyor and operative to produce millimeter wave data, an image reconstruction processor configured to produce a three-dimensional millimeter wave image using the millimeter wave data, and a classification processor configured to estimate a probability that the parcel contains an anomaly using a logistic regression classifier operating on at least a portion of the millimeter wave image.

In some aspects of the technology, the classification processor generates a trigger signal to divert the parcel when the probability that the parcel contains an anomaly exceeds a selected threshold. In some aspects, the logistic regression classifier utilizes a one or more voxel thick slice of the three-dimensional image to calculate the probability that the parcel contains an anomaly. In some aspects, the anomaly comprises a non-paper inclusion in the parcel. In various aspects of the technology, the three-dimensional millimeter wave image is comprised of voxels, each having an associated millimeter wave reflectivity. In some aspects, the millimeter wave reflectivity comprises a real portion and an imaginary portion. In some aspects, the logistic regression classifier operates on the magnitude of the mean of one or more voxel layers comprising the millimeter wave image.

In some embodiments, a method for detecting anomalies in a parcel can include scanning a parcel moving along a conveyor with multiple millimeter wave imaging sensor modules, collecting reflection measurements from the sensor modules, and constructing a one or more voxel thick horizontal 3D image of the parcel. An image of the parcel can be created comprising the magnitude of the mean of the one or more voxel layers. In some embodiments, the image of the parcel can be fed into a logistic regression classifier. The method can also include receiving a probability that the parcel contains an anomaly from the classifier and causing the parcel to be diverted from the conveyor when the probability is greater than a selected threshold. In some aspects of the technology, the classifier is trained using a set of labeled images.

BRIEF DESCRIPTION OF THE DRAWINGS

The systems and methods described herein may be better understood by referring to the following Detailed Description in conjunction with the accompanying drawings, in which like reference numerals indicate identical or functionally similar elements.

Figure 1:
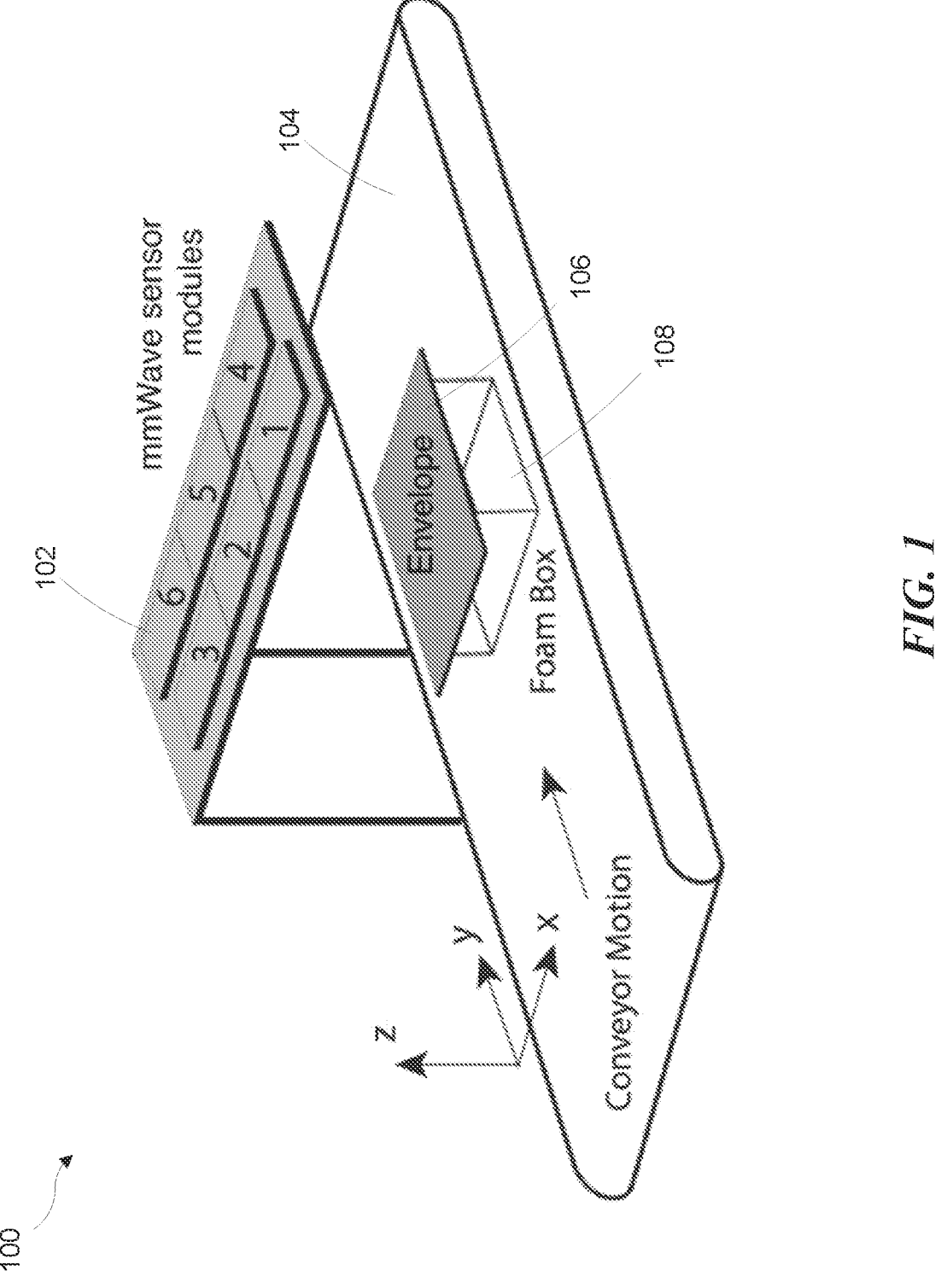
FIG. 1 is a diagram illustrating a high throughput anomaly detection system according to some embodiments of the disclosed technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and alternatives falling within the scope of this disclosure.

DETAILED DESCRIPTION

Various examples of the systems and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such.

Disclosed are methods and systems for high-throughput K-Band (24 GHz) mmWave imaging used to scan envelopes and thin packages transiting a conveyor belt. This imaging system is capable of supporting high conveyor speeds and enables non-destructive imaging inside sealed envelopes. An automated screening algorithm that uses a logistic regression approach to detect anomalies among the expected paper documents is also described. Automatic anomaly detection eliminates the need for human labor and allows for high-throughput diversion of suspect envelopes for secondary screening.

Examples of mmWave detection of non-paper inclusions such as metalized plastic and metal items among paper documents in paper, cardboard, and Tyvek envelopes, as well as padded bubble packs, are presented. Resolution better than 1 cm in the plane of the envelope is demonstrated, allowing for identification of sub-cm3 anomalies, and methods and systems for automated first-pass flagging of suspect envelopes are described.

Example images and initial classification results based on logistic regression are presented, in which anomaly detection is based on a static supervised learning model. The simplicity of the modeling is aided by narrowing of scope to a particular category of contents (metallic and thus highly reflective of mmWaves), which happens to correspond well to many contraband items of interest, as seen in Table 1. Table 1 lists envelope materials and content types used in various combinations.

TABLE 1

| Envelope materials | Contraband content types |
| --- | --- |
| vendor A cardboard | passport (modern) |
| vendor B cardboard | credit card (with chip) |
| Tyvek | Xacto blade |
| plastic bubble mailer | razor blade |
| | Mylar baggies small, med, large |
| | 10 g sugar in some med & Ig Mylar baggies |

With reference to FIG. 1, a mmWave imaging system 100 uses mmWave sensor modules 102 comprised of transmit and receive antennas that may be arranged to image the appropriate volume. The modules may be stacked in a two-column configuration along the X axis. The conveyor 104 moves with approximately constant velocity in Y, allowing sampling of the scene with mmWave reflection measurements to enable reconstruction of those measurements into a 3D mmWave image. Each voxel in this image represents the complex mmWave reflectivity of that part of the scene. A voxel is a unit of graphic information that defines a point in three-dimensional space.

Figure 2:
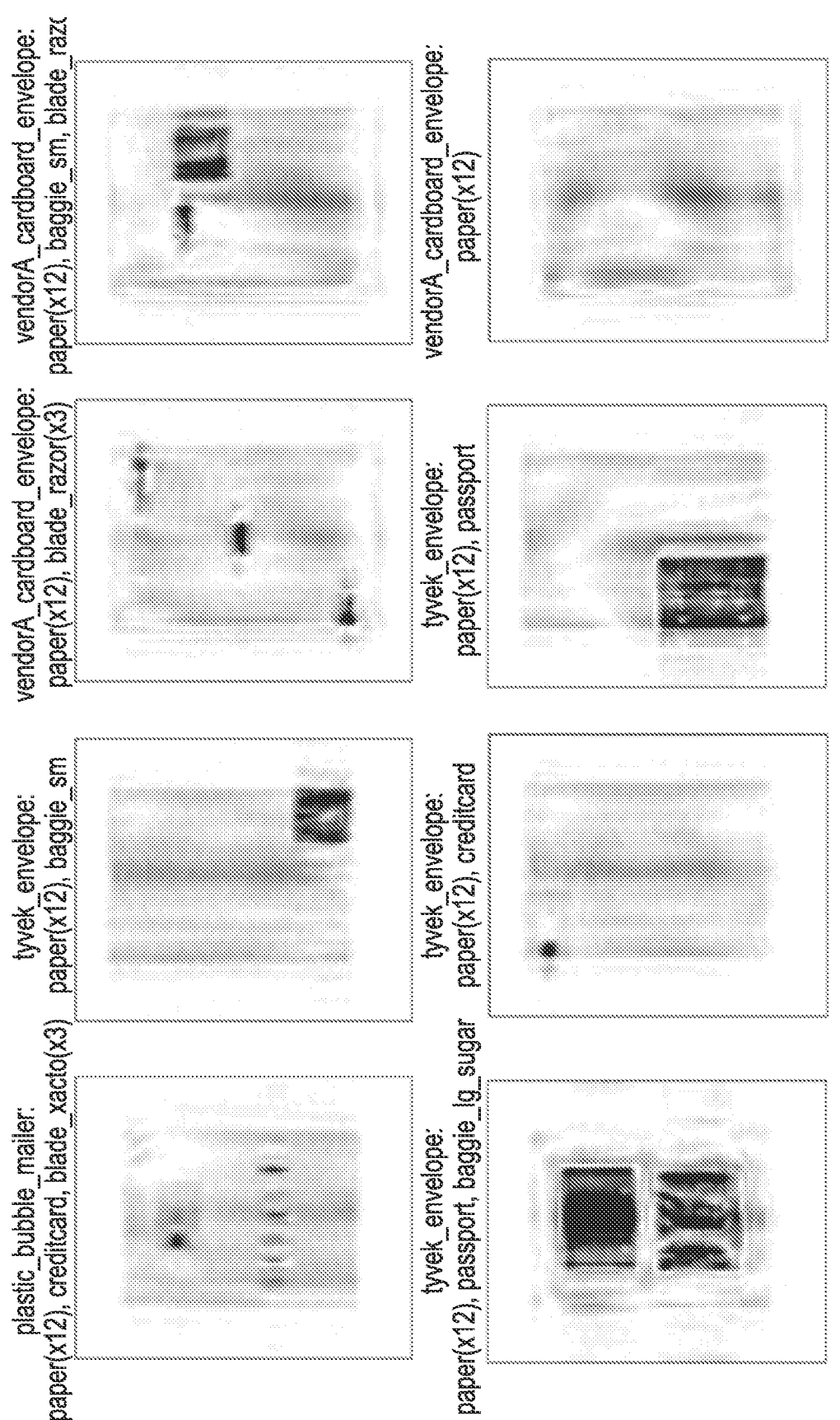
FIG. 2 includes examples of image plots of envelopes containing various items of contraband derived according to some embodiments of the disclosed technology.

An example dataset can include 101 mmWave 3D images of envelopes with combinations of the materials and contents shown in Table 1. In addition to optional contraband contents, in all images the envelopes contained 12 sheets of standard printer paper. The envelope 106 may optionally rest on a foam box 108 or another supporting material such as a tray made of a non-reflective material to ensure responses to its contents are distinguished from reflections from the conveyor. Example mmWave images of these envelopes are seen in FIG. 2, where each envelope contains 12 sheets of paper and various contraband items taped inside them. These images are imaged with six mmWave sensor modules. The envelope at bottom right contains only paper and the rest contain contraband items in addition to the paper.

The imaging reconstruction domain is a one or more voxel thick horizontal sheet centered vertically at the level of the envelopes (the plots in FIG. 2 show the magnitude of the mean of these two layers). Predictive performance is compared between several groupings of mmWave sensor modules to investigate the tradeoff between number of modules and accuracy of the prediction. Images in this example dataset are marked with the ground truth of with- or without-contraband and used for training and evaluation of the classifier. The dataset has more with-contraband images than without.

From the original measurements of the scans, the dataset may be re-imaged three times, using three subsets of the mmWave sensor modules, which can be enabled or disabled in software. Referring again to FIG. 1, the three subsets of modules, which have 6, 3, and 2 modules respectively (mounted across the x-axis) aim down the Z-axis from above the horizontal envelopes, while the envelopes are moved on a conveyor along the Y-axis. The accuracy of the detector may be evaluated for each of the three subsets of sensor modules to facilitate the key tradeoff between hardware cost and complexity vs. detection accuracy.

A binary classifier predicts the probability that the image contains any of the contraband seen in the dataset. This prediction allows the imaging system to trigger a diverter on the conveyor system, to route away items for further inspection when the predicted probability of anomaly is greater than a threshold. Such a diverter may be controlled by a programmable logic control (PLC) system that is triggered in response to the output of a classifier. One example classifier is a logistic regression operating on the maximum image intensity over the image voxels. It should be appreciated that the imaging system provides complex-valued reflectivity per voxel, not just intensity, but high performance for this application may be obtained based on intensity alone.

Figure 3A:
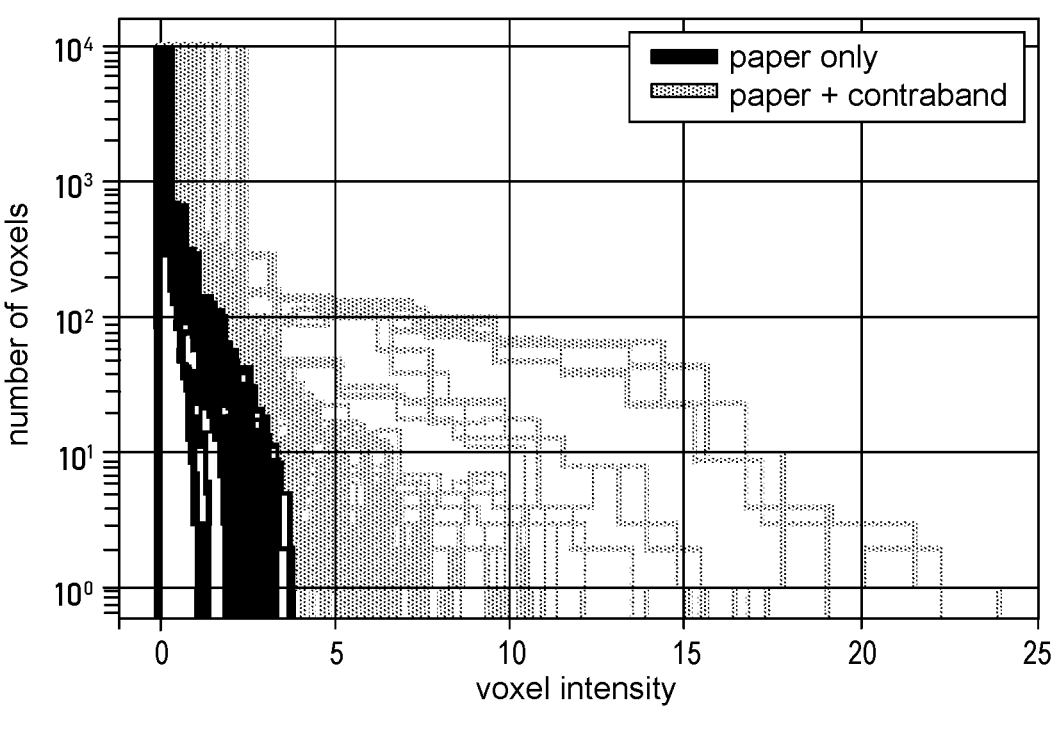
FIG. 3A illustrates image intensity distributions for images of envelopes with and without contraband according to some embodiments of the disclosed technology.
Figure 3B:
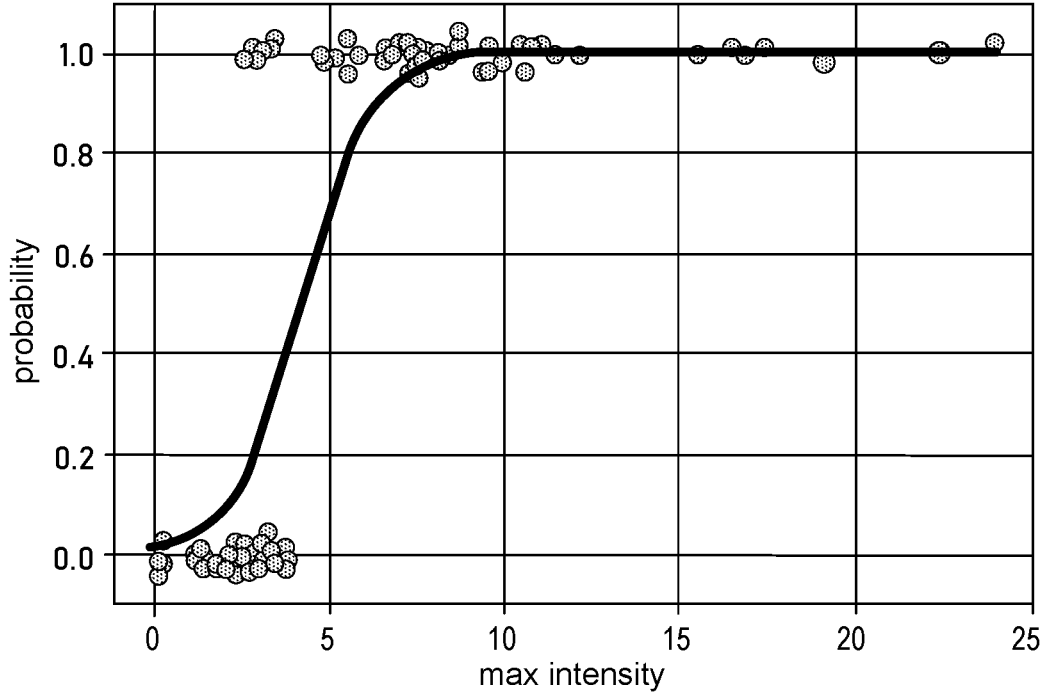
FIG. 3B illustrates a plot corresponding the FIG. 3A showing fit of a logistic regression model to the maximum intensities according to some embodiments of the disclosed technology.

FIG. 3A shows an example intensity distributions of the 101 images as imaged by three modules. There is strong separability of these images with and without reflective contraband contents based on their intensities. In one example, there are 57 images with anomalies and 44 without anomalies in the dataset. Logistic regression can be susceptible to bias caused by class imbalance (and some datasets have greater class imbalance than this), so the SMOTE over-sampling method is used to balance the data, and a 5-fold cross validation approach to generalize evaluation over multiple train/test splits of the dataset. The logistic regression can be regularized by an L2 term whose weighting is estimated in the cross validation; the optimization can be solved by the limited-memory Broyden-Fletcher-Goldfarb-Shanno (L-BFGS) method (a quasi-Newton method). With the data balanced in the cross validation folds, the model can be optimized based on mean accuracy to find the best regularization parameter. As depicted in FIG. 3B, the model fits a sigmoid probability curve to the discrete ground truth points plotted at probability 0.0 and 1.0. Points jittered in Y-axis on right merely to aid visualization. Some overlap is seen here in the maximum intensities of each class; for 2 modules there is more overlap and for 6 modules there is no overlap at all in this dataset.

Figure 4:
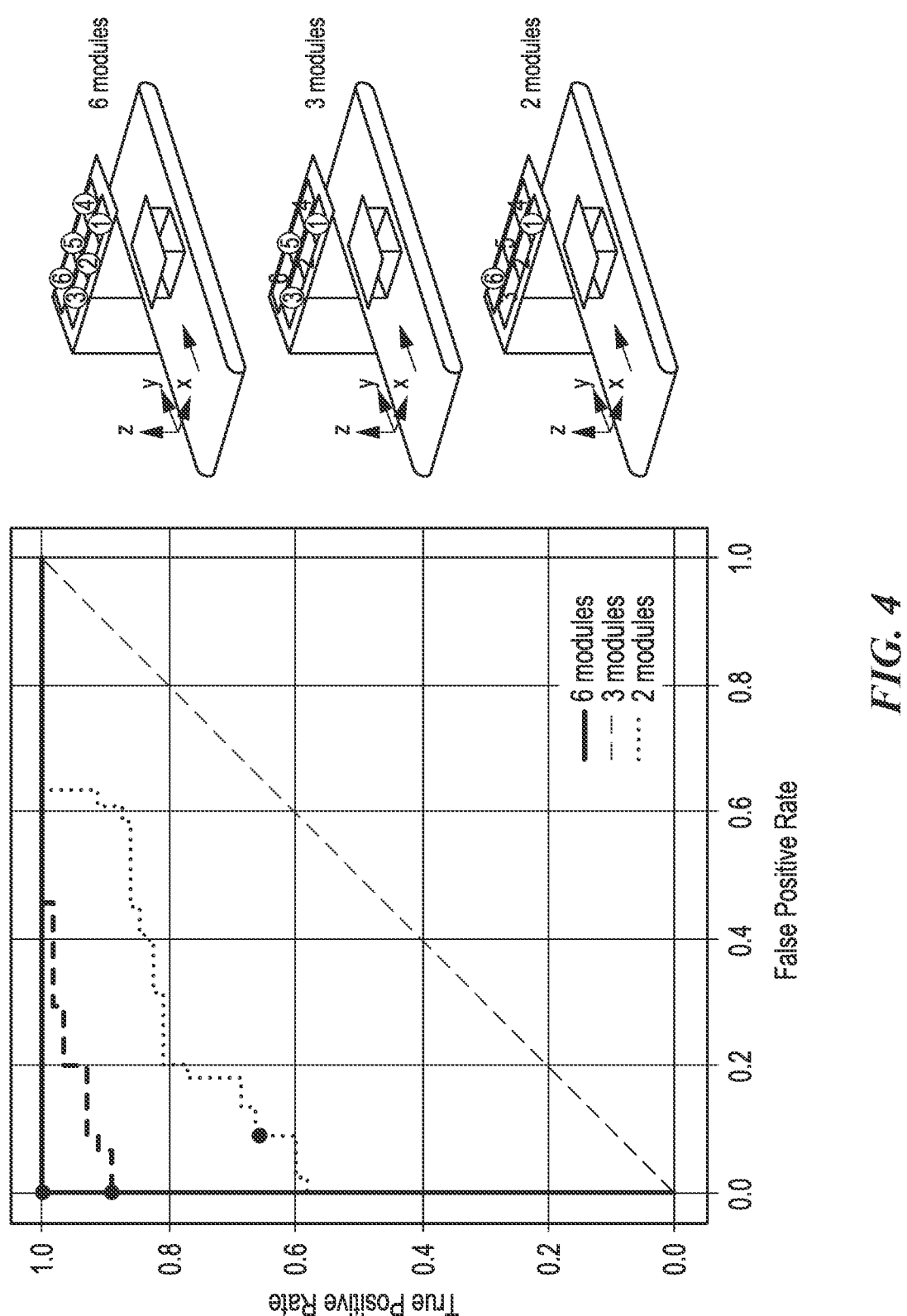
FIG. 4 illustrates a plot of ROC curves showing performance for 6, 3, and 2 sensor modules according to some embodiments of the disclosed technology.

FIG. 4 shows receiver operating characteristic (ROC) curves for the three subsets of mmWave sensor modules, which have 6, 3, and 2 modules; it also highlights which modules were used in each case, referring to the equipment layout in FIG. 1. Table 2 lists the mean classification performance over the 5 folds of cross validation mentioned above.

| #Modules | ROC AUC | Accuracy | TPR | FPR | PPV | NPV |
|---|---|---|---|---|---|---|
| 6 | 1.000 | 1.000 | 1.000 | 0.000 | 1.000 | 0.000 |
| 3 | 0.986 | 0.940 | 0.891 | 0.000 | 1.000 | 0.091 |
| 2 | 0.829 | 0.762 | 0.642 | 0.089 | 0.906 | 0.292 |

The table's values are cited at the operating points shown on the ROC curves, which correspond to the accuracy-optimized solution points for the regularization parameters. The black dots on the ROC curves depict the operating points at which the performance stats in Table 2 are reported; these are the points of maximal accuracy at which the models' regularization parameters were solved. The table includes performance metrics of: the area under the ROC curve (ROC AUC), accuracy, true positive rate (TPR), false positive rate (FPR), positive predictive value (PPV), and negative predictive value (PPV). The ROC AUC is the one metric here that is independent of the operating point choice—it is equivalent to the probability the model will assign a higher probability score to a randomly chosen positive class than to a randomly chosen negative class. The TPR, FPR, PPV, and NPV metrics are concerned with false positives and false negatives in the predictions, and it can be seen by the 0.0 FPR and 1.0 PPV in Table 2 that the 6-module and 3-module cases have no false positives at all. Similarly, as evident by its 0.0 NPV, the 6-module case had no false negatives either.

The classification performance degrades with decreasing number of sensor modules. With all six modules mounted along the top of the sensor archway, the separation between the max intensities for the two classes is quite wide in this dataset, with a significant gap between the max intensities for paper-only and paper-plus-anomaly images, and performance was perfect for this dataset in that case. With half the number of sensor modules the performance achieved is 94% accuracy and 99% ROC AUC. The performance for the 2-module case was significantly worse at 76% accuracy and 83% ROC AUC—those images were much more decimated and unevenly illuminated due to the limited modules used.

This work presents examples of a probabilistic, binary classifier to detect contraband items contained in a variety of common mailer envelopes, and presented examples of typical mmWave images of those scenarios. On an example dataset of 101 images, with a variety of envelope and contraband types per Table 1, perfect performance was obtained when using all mmWave sensor modules.

For the application of selecting mail envelopes to divert for further inspection for contraband contents, similar or different operating points on ROC curves to those in FIG. 4 may be chosen depending on available secondary inspection resources. Where resource-constrained, a reasonable choice is to tolerate very limited false positives with the goal of reducing contraband flux by some amount, at the cost of letting some amount still go though (false negatives). But with additional secondary inspection resources available, it may be preferable to minimize false negatives (maximize true positive rate) to minimize the number of contraband items that pass, at the cost of diverting and sending to secondary screening more packages than actually have contraband.

Figure 5:
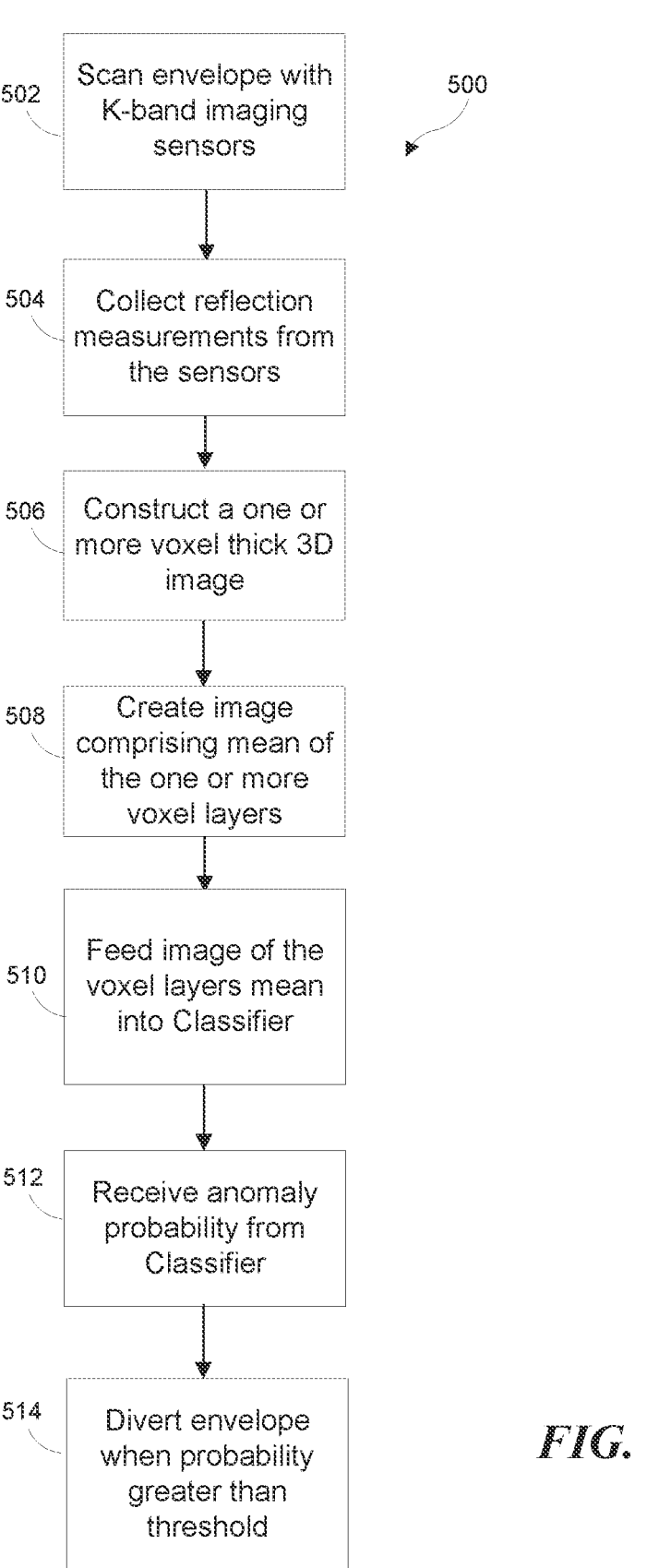
FIG. 5 is a flow diagram showing a method for detecting anomalies in an envelope according to some embodiments of the disclosed technology.

FIG. 5 is a flow diagram showing a method 500 for detecting anomalies in an envelope. In some embodiments, at step 502 the method can comprise scanning an envelope moving along a conveyor with multiple K-band imaging sensor modules. At step 504, the method can include collecting reflection measurements from the sensor modules. At step 506, the method can include constructing a one or more voxel thick horizontal 3D image of the envelope. At step 508, the method can include creating an image of the envelope comprising the magnitude of the mean of the one or more voxel layers. At step 510, the method can include feeding the image of the envelope into a binary logistic regression classifier. At step 512, the method can include receiving a probability that the envelope contains an anomaly from the classifier. At step 514, the method can include causing the envelope to be diverted from the conveyor when the probability is greater than a selected threshold.

Suitable System

The techniques disclosed here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 6:
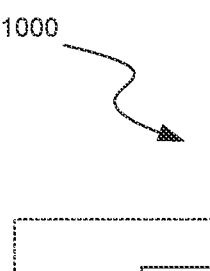
FIG. 6 is a block diagram illustrating an overview of devices on which some implementations can operate.
Figure 6:
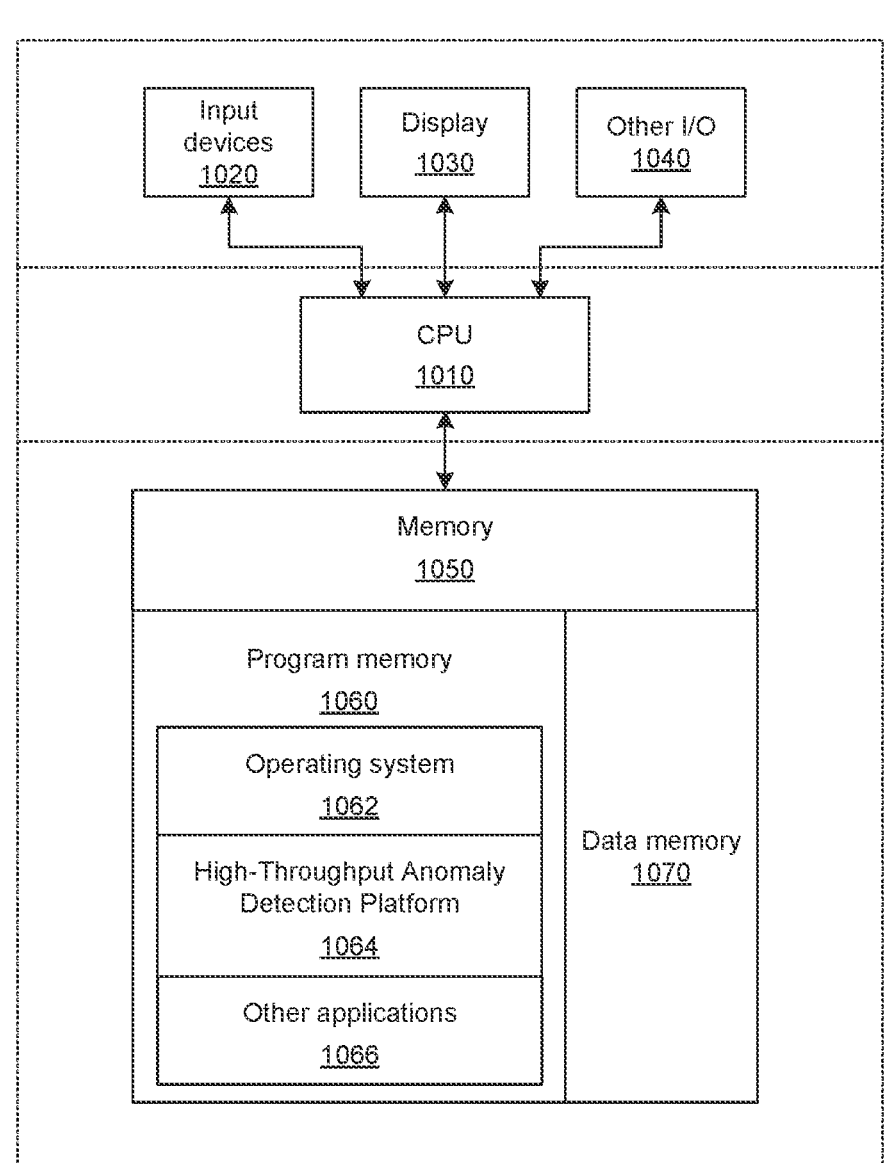

Several implementations are discussed below in more detail in reference to the figures. FIG. 6 is a block diagram illustrating an overview of devices on which some implementations of the disclosed technology can operate. The devices can comprise hardware components of a device 1000 that captures mmWave images, for example. Device 1000 can include one or more input devices 1020 that provide input to the CPU (processor) 1010, notifying it of actions. The actions are typically mediated by a hardware controller that interprets the signals received from the input device and communicates the information to the CPU 1010 using a communication protocol. Input devices 1020 include, for example, a mouse, a keyboard, a touchscreen, a mmWave imaging sensor (e.g., a K-band mmWave imaging sensor operating at 24 GHZ), an infrared sensor, a touchpad, a wearable input device, a camera or image-based input device, a microphone, or other user input devices.

CPU 1010 can be a single processing unit or multiple processing units in a device or distributed across multiple devices. CPU 1010 can be coupled to other hardware devices, for example, with the use of a bus, such as a PCI bus or SCSI bus. The CPU 1010 can communicate with a hardware controller for devices, such as for a display 1030. Display 1030 can be used to display text and graphics. In some examples, display 1030 provides graphical and textual visual feedback to a user. In some implementations, display 1030 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 1040 can also be coupled to the processor, such as a network card, video card, audio card, USB, FireWire or other external device, sensor, camera, printer, speakers, CD-ROM drive, DVD drive, disk drive, or Blu-Ray device. Further I/O devices 1040 may include a diverter that is configured to divert items under the control of CPU 1010.

In some implementations, the device 1000 also includes a communication device capable of communicating wirelessly or wire-based with a network node. The communication device can communicate with another device or a server through a network using, for example, TCP/IP protocols. Device 1000 can utilize the communication device to distribute operations across multiple network devices.

The CPU 1010 can have access to a memory 1050. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 1050 can include program memory 1060 that stores programs and software, such as an operating system 1062, high-throughput anomaly detection platform 1064, and other application programs 1066. Memory 1050 can also include data memory 1070 that can include database information, etc., which can be provided to the program memory 1060 or any element of the device 1000.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, programmable consumer electronics, network PCs, minicomputers, mainframe computers, distributed computing environments that include any of the above systems or devices, or the like.

Figure 7:
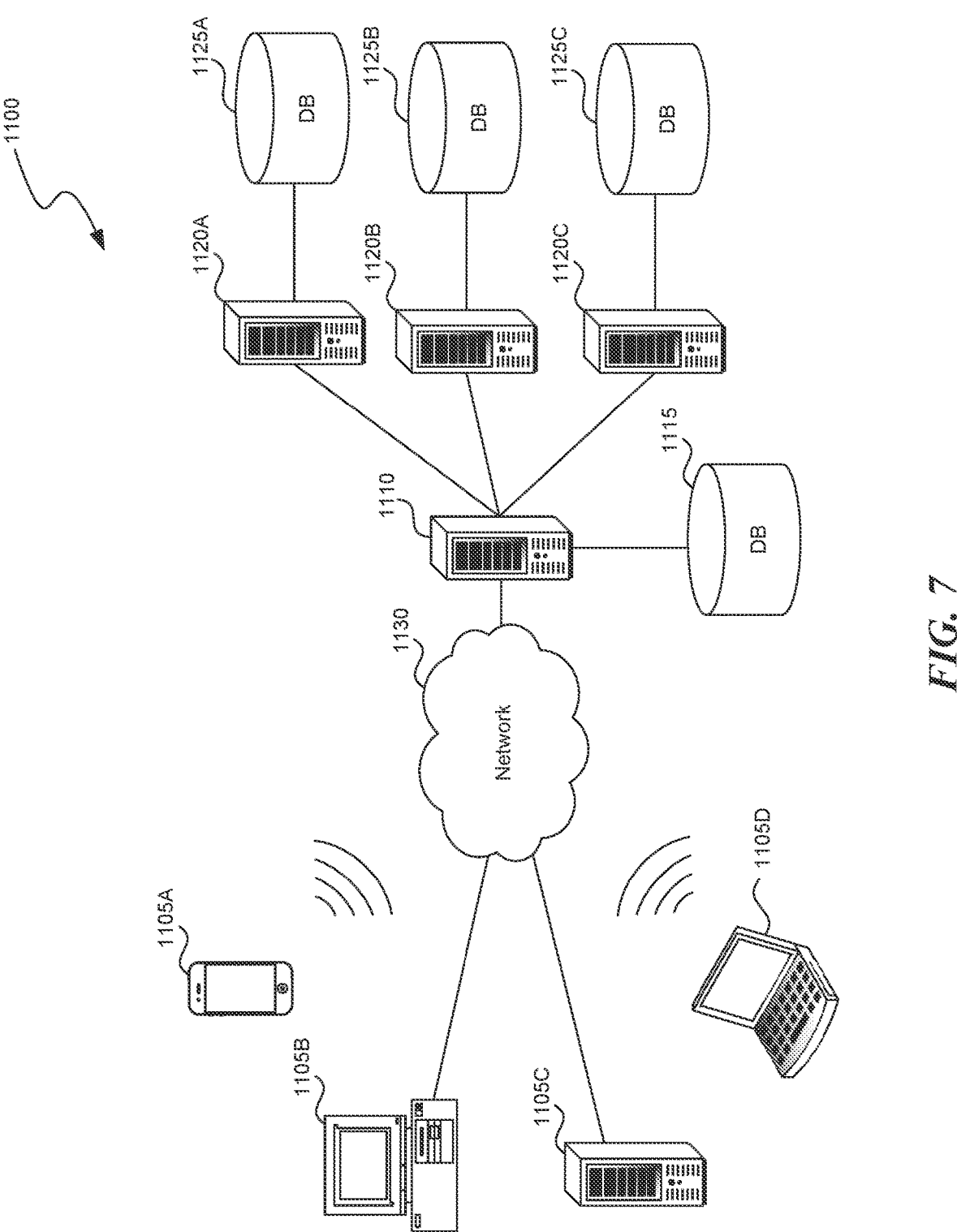
FIG. 7 is a block diagram illustrating an overview of an environment in which some implementations can operate.

FIG. 7 is a block diagram illustrating an overview of an environment 1100 in which some implementations of the disclosed technology can operate. Environment 1100 can include one or more client computing devices 1105A-D, examples of which can include device 1000. Client computing devices 1105 can operate in a networked environment using logical connections through network 1130 to one or more remote computers, such as a server computing device 1110.

In some implementations, server computing device 1110 can be an edge server that receives client requests and coordinates fulfillment of those requests through other servers, such as servers 1120A-C. Server computing devices 1110 and 1120 can comprise computing systems, such as device 1000. Though each server computing device 1110 and 1120 is displayed logically as a single server, server computing devices can each be a distributed computing environment encompassing multiple computing devices located at the same or at geographically disparate physical locations. In some implementations, each server computing device 1120 corresponds to a group of servers.

Client computing devices 1105 and server computing devices 1110 and 1120 can each act as a server or client to other server/client devices. Server 1110 can connect to a database 1115. Servers 1120A-C can each connect to a corresponding database 1125A-C. As discussed above, each server 1120 can correspond to a group of servers, and each of these servers can share a database or can have their own database. Databases 1115 and 1125 can warehouse (e.g., store) information. Though databases 1115 and 1125 are displayed logically as single units, databases 1115 and 1125 can each be a distributed computing environment encompassing multiple computing devices, can be located within their corresponding server, or can be located at the same or at geographically disparate physical locations.

Network 1130 can be a local area network (LAN) or a wide area network (WAN), but can also be other wired or wireless networks. Network 1130 may be the Internet or some other public or private network. Client computing devices 1105 can be connected to network 1130 through a network interface, such as by wired or wireless communication. While the connections between server 1110 and servers 1120 are shown as separate connections, these connections can be any kind of local, wide area, wired, or wireless network, including network 1130 or a separate public or private network.

Figure 8:
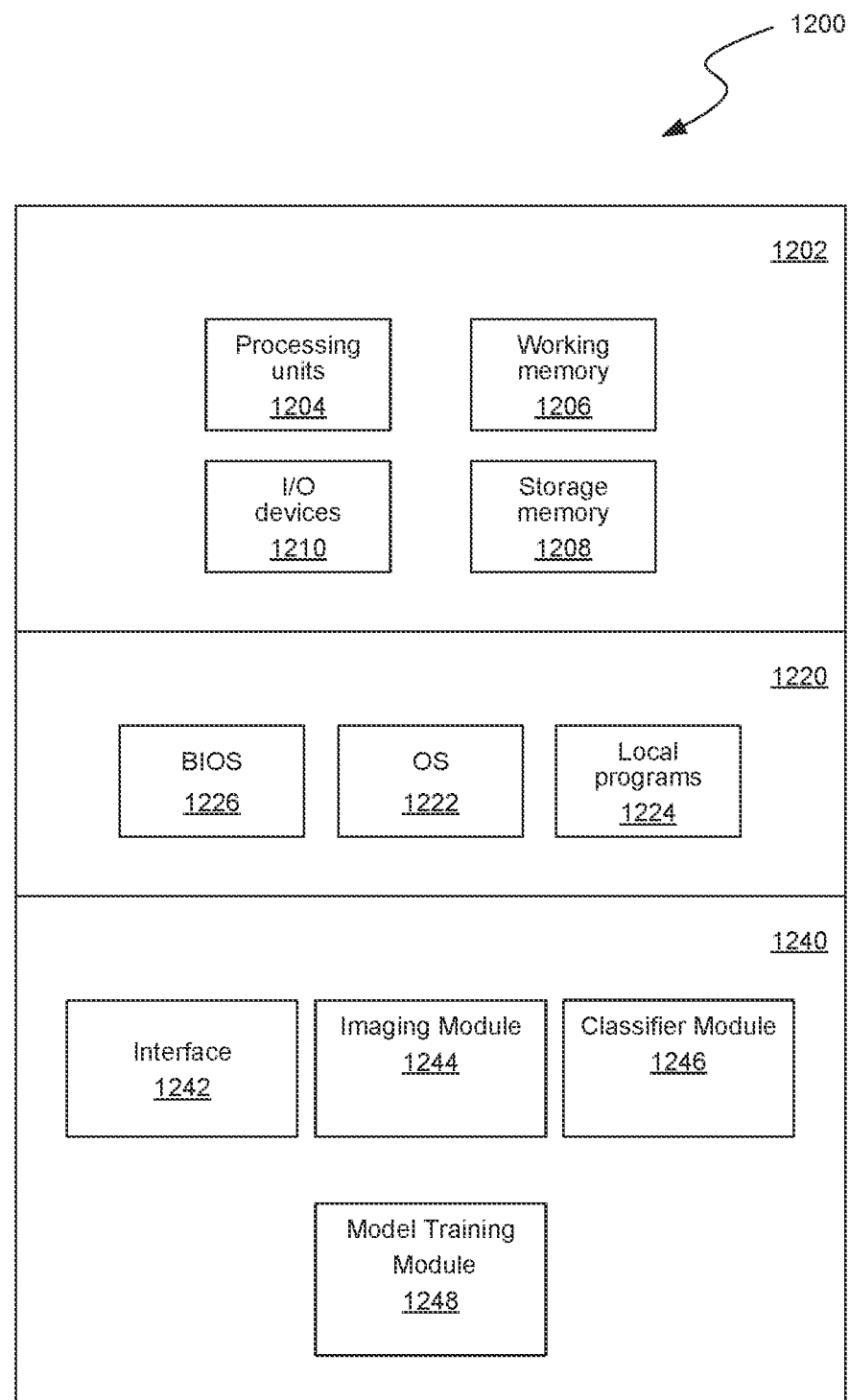
FIG. 8 is a block diagram illustrating components which, in some implementations, can be used in a system employing the disclosed technology.

FIG. 8 is a block diagram illustrating components 1200 which, in some implementations, can be used in a system employing the disclosed technology. The components 1200 include hardware 1202, general software 1220, and specialized components 1240. As discussed above, a system implementing the disclosed technology can use various hardware, including processing units 1204 (e.g., CPUs, GPUs, APUs, etc.), working memory 1206, storage memory 1208, and input and output devices 1210. Components 1200 can be implemented in a client computing device such as client computing devices 1105 or on a server computing device, such as server computing device 1110 or 1120.

General software 1220 can include various applications, including an operating system 1222, local programs 1224, and a basic input output system (BIOS) 1226. Specialized components 1240 can be subcomponents of a general software application 1220, such as local programs 1224. Specialized components 1240 can include an Imaging Module 1244, a Classifier Module 1246, a Model Training Module 1248, and components that can be used for transferring data and controlling the specialized components, such as interface 1242. In some implementations, components 1200 can be in a computing system that is distributed across multiple computing devices or can be an interface to a server-based application executing one or more of specialized components 1240.

Those skilled in the art will appreciate that the components illustrated in FIGS. 6-8 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described herein.

Although specific embodiments have been shown by way of example in the drawings and are described in detail above, other embodiments are possible. For example, in some embodiments, a method for detecting anomalies in an envelope can include scanning an envelope moving along a conveyor with multiple K-band imaging sensor modules and collecting reflection measurements from the sensor modules. The method can further include constructing a one or more voxel thick horizontal 3D image of the envelope and then creating an image of the envelope comprising the magnitude of the mean of the one or more voxel layers. The image of the envelope can be fed into a binary logistic regression classifier to provide a probability that the envelope contains an anomaly from the classifier. The method can include causing the envelope to be diverted from the conveyor when the probability is greater than a selected threshold.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A system for detecting anomalies in an envelope, the system comprising:
   a conveyor operative to carry the envelope;
   an active millimeter wave antenna array comprising at least one transmitting antenna and multiple receiving antennas disposed proximate to the conveyor and operative to produce millimeter wave data;
   an image reconstruction processor configured to produce a three-dimensional millimeter wave image using the millimeter wave data; and
   a classification processor configured to estimate a probability that the envelope contains an anomaly using a logistic regression classifier operating on at least a portion of the millimeter wave image, wherein the logistic regression classifier operates on a magnitude of a mean of two or more voxel layers comprising the three-dimensional millimeter wave image, and wherein the logistic regression classifier is trained on millimeter-wave envelope image volumes depicting anomalies.

2. The system of claim 1, wherein the classification processor generates a trigger signal to divert the envelope when the probability that the envelope contains an anomaly exceeds a selected threshold.

3. The system of claim 1, wherein the logistic regression classifier utilizes a one or more voxel thick slice of the three-dimensional image to calculate the probability that the envelope contains an anomaly.

4. The system of claim 1, wherein the anomaly comprises a non-paper inclusion in the envelope.

5. The system of claim 1, wherein the three-dimensional millimeter wave image is comprised of voxels, each having an associated millimeter wave reflectivity.

6. The system of claim 1, wherein the millimeter wave reflectivity comprises a real portion and an imaginary portion.

7. A method for detecting anomalies in an envelope, comprising:
   scanning the envelope as it moves along a conveyor with multiple millimeter wave imaging sensor modules, disposed proximate to the conveyor,
   wherein each millimeter wave imaging sensor module comprises at least one transmitting antenna and multiple receiving antennas operative to produce reflection measurements;
   collecting the reflection measurements from the millimeter wave imaging sensor modules;
   constructing, using the reflection measurements, a three-dimensional image of the envelope;
   feeding a magnitude of a mean of two or more voxel layers comprising the image of the envelope into a logistic regression classifier that is trained on millimeter-wave envelope image volumes depicting anomalies;
   receiving, from the classifier, a probability that the envelope contains an anomaly; and
   causing the envelope to be diverted from the conveyor when the probability is greater than a selected threshold.

8. The method of claim 7, wherein the classifier is trained using a set of labeled image volumes.

9. The method of claim 7, wherein the anomaly comprises a non-paper inclusion in the envelope.

10. The method of claim 7, wherein the image is comprised of voxels, each having an associated millimeter wave reflectivity.

11. The method of claim 10, wherein the millimeter wave reflectivity comprises a real portion and an imaginary portion.

* * * * *